United States Patent
Asai et al.

(10) Patent No.: US 11,511,810 B2
(45) Date of Patent: Nov. 29, 2022

(54) VEHICLE ROOF STRUCTURE AND METHOD FOR ASSEMBLING THE SAME

(71) Applicant: TOYOTA JIDOSHA KABUSHIKI KAISHA, Toyota (JP)

(72) Inventors: Masayoshi Asai, Nagoya (JP); Masaki Nitta, Toyota (JP); Koji Amemiya, Kazaki (JP); Yusaku Hamuro, Seto (JP); Kazuhiro Morita, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/539,503

(22) Filed: Dec. 1, 2021

(65) Prior Publication Data
US 2022/0177040 A1 Jun. 9, 2022

(30) Foreign Application Priority Data
Dec. 4, 2020 (JP) .............................. JP2020-202155

(51) Int. Cl.
*B62D 25/06* (2006.01)
*B62D 65/06* (2006.01)
*B62D 27/02* (2006.01)

(52) U.S. Cl.
CPC .............. *B62D 25/06* (2013.01); *B62D 65/06* (2013.01)

(58) Field of Classification Search
CPC ....... B62D 25/06; B62D 65/06; B62D 27/026
See application file for complete search history.

(56) References Cited

U.S. PATENT DOCUMENTS

| 8,820,824 | B1* | 9/2014 | Hinz | B62D 29/008 |
| | | | | 296/210 |
| 2010/0127532 | A1* | 5/2010 | Hosaka | B62D 25/06 |
| | | | | 296/193.06 |
| 2015/0217812 | A1* | 8/2015 | Hinz | B62D 25/06 |
| | | | | 296/210 |
| 2018/0215420 | A1* | 8/2018 | Hashimura | B23K 9/025 |

FOREIGN PATENT DOCUMENTS

| DE | 102018103707 A1 * | 10/2018 | ............. B62D 25/06 |
| JP | 2018177143 A * | 11/2018 | ............. B62D 25/06 |
| JP | 2018177143 A | 11/2018 | |

OTHER PUBLICATIONS

Mochizuki; JP2018177143A; Roof Structure; Nov. 15, 2018; EPO English Machine Translation, pp. 1-6 (Year: 2022).*

* cited by examiner

*Primary Examiner* — Bayan Salone
(74) *Attorney, Agent, or Firm* — Dickinson Wright, PLLC

(57) ABSTRACT

Provided is a method for assembling a vehicle roof structure capable of suppressing occurrence of distortion of a roof panel. The method includes an application portion forming step, a roof panel disposing step, a roof panel mechanically fixing step, and a mastic adhesive curing step. In the application portion forming step, a plurality of application portions is formed such that among the plurality of application portions, a central application portion disposed at a center of a cross member in a vehicle width direction has a length that is shorter than a length of an end-side application portion disposed on opposite sides of the center in the vehicle width direction.

6 Claims, 8 Drawing Sheets

| Reference Example 1 | Reference Example 2 |
|---|---|
| One dot-shaped application portion  | Two dot-shaped application portions  |
| Reference Example 3 | Reference Example 4 |
| Two dot-shaped application portions  | Line-shaped application portion  |

VEHICLE ROOF STRUCTURE AND METHOD FOR ASSEMBLING THE SAME

CROSS REFERENCE TO RELATED APPLICATIONS

The present application claims priority from Japanese patent application JP 2020-202155 filed on Dec. 4, 2020, the entire content of which is hereby incorporated by reference into this application.

BACKGROUND

Technical Field

The present disclosure relates to a vehicle roof structure and a method for assembling a vehicle roof structure. More particularly, the present disclosure relates to a vehicle roof structure including a roof panel fixed by a mastic adhesive and a method for assembling such vehicle roof structure.

Background Art

Such type of vehicle roof structure conventionally proposed is a roof panel for automobiles described in JP 2018-177143 A. This vehicle roof structure includes a roof panel attached so as to close the space surrounded by a front header, a rear header, and a pair of side rails. This roof panel is mechanically fixed to the upper structure, which includes the front header, the rear header, and the pair of side rails, through spot welding or by means of bolts. In addition, the vehicle roof structure includes cross members that couple the pair of side rails in a vehicle width direction as the upper structure. The roof panel is bonded to the cross members by a mastic adhesive, for example. The mastic adhesive is applied to the cross members in a line shape, and such a mastic adhesive applied in a line shape ensures the adhesive strength.

SUMMARY

By the way, in assembling the vehicle roof structure described in JP 2018-177143 A, firstly line-shaped application portions having a mastic adhesive applied thereto are formed on the cross members, and then the roof panel is mechanically fixed to the upper structure. Thereafter, the application portions, together with the upper structure and the roof panel, may be heated through baking and drying of the roof panel after coating and the like, so as to allow the mastic adhesive of the application portions to cure. During such heating, the temperature of the roof panel rises faster than that of the cross members, and thus the roof panel at its perimeter bound by the upper structure deforms to expand. Thereafter, the temperature of the cross members also rises in accordance with the temperature profile of the roof panel. This makes the roof panel, which has deformed to expand, try to return to its original shape. However, the mastic adhesive starts to cure at a timing when the roof panel deforms to expand. In this case, even if the roof panel tries to return to its original shape after the mastic adhesive cures, the application portions having the mastic adhesive applied thereto may block the deformation of the roof panel. This may generate distortion on the surface of the roof panel.

In addition, in the vehicle roof structure, the roof panel may undergo thermal expansion and thermal contraction with heat from the outside. At this time, the central portion of the roof panel in the vehicle width direction is more likely to be displaced vertically as compared to the portions on the opposite sides of the central portion. However, with a large binding force at the center of the roof panel by the mastic adhesive applied to the central portion of the cross members, the roof panel may be distorted due to the thermal expansion and thermal contraction.

The present disclosure has been made in view of the foregoing, and provides a vehicle roof structure capable of suppressing occurrence of distortion of the roof panel and a method for assembling such vehicle roof structure.

In view of the foregoing, the method for assembling a vehicle roof structure according to the present disclosure is a method for assembling a vehicle roof structure including: an upper structure including a front header located on a front side of a vehicle, a rear header located on a rear side of a vehicle, a pair of side rails adapted to couple opposite ends of the front header in a vehicle width direction and couple opposite ends of the rear header in a vehicle width direction, and a cross member adapted to couple the pair of side rails in a vehicle width direction; and a roof panel fixed to the upper structure so as to close a space surrounded by the front header, the rear header, and the pair of side rails from above the cross member.

The method for assembling a vehicle roof structure includes: forming a plurality of application portions having a mastic adhesive applied thereto on the cross member with a distance therebetween in a vehicle width direction; disposing the roof panel on the upper structure via the plurality of application portions so as to close the space surrounded by the front header, the rear header, and the pair of side rails from above the cross member; mechanically fixing the roof panel to the front header, the rear header, and the pair of side rails; and curing the mastic adhesive by heating the plurality of application portions together with the upper structure and the roof panel. In the forming of the plurality of application portions, the plurality of application portions is formed such that among the plurality of application portions, a central application portion disposed at a center of the cross member in the vehicle width direction has a length that is shorter than a length of an end-side application portion disposed on opposite sides of the center in the vehicle width direction.

According to the present disclosure, firstly application portions having a mastic adhesive applied thereto are formed on the cross member, and then the roof panel is mechanically fixed to the front header, the rear header, and the pair of side rails. Thereafter, the application portions, together with the upper structure and the roof panel, are heated through baking and drying of the roof panel after coating on the surface of the roof panel and the like, so as to allow the mastic adhesive of the application portions to cure. During such heating, the temperature of the roof panel rises faster than that of the cross member, and thus the roof panel at its perimeter bound by the upper structure deforms to expand. Thereafter, the temperature of the cross member also rises in accordance with the temperature profile of the roof panel. This makes the roof panel, which has deformed to expand, try to return to its original shape.

At this time, since the plurality of application portions is formed such that the central application portion has a length that is shorter than a length of the end-side application portion, it is possible to suppress the binding force of the central application portion at the center of the roof panel in the vehicle width direction. As such, even if the mastic adhesive of the central application portion starts to cure, it is difficult to block the phenomenon in which the roof panel that once deformed to expand tries to return to its original shape, and it is possible to suppress distortion of the roof panel. Accordingly, it is possible to allow the roof panel to be securely bonded to the cross member via the end-side application portions on the opposite sides of the center of the roof panel while suppressing distortion of the center which easily deforms. As a result, it is possible to prevent unnatural reflection on the surface of the roof panel caused by the distortion while ensuring the fixing of the roof panel.

In some embodiments, the central application portion is formed in a dot shape and the end-side application portion is formed in a line shape. With such a configuration, since the dot-shaped central application portion has a smaller amount of the mastic adhesive applied than the amount of the mastic adhesive in the other portions, the binding of the roof panel can be suppressed. As a result, it is possible to suppress distortion of the roof panel and prevent unnatural reflection on the surface of the roof panel. Meanwhile, since the line-shaped end-side application portion has a length that is longer than the length of the central application portion in the vehicle width direction, the adhesive strength between the roof panel and the cross member can be increased.

In some embodiments, the plurality of application portions is formed on the cross member in two lines in a vehicle front-rear direction. A plurality of front application portions in one line on the front side of the vehicle is formed with a distance therebetween in the vehicle width direction and a plurality of rear application portions in one line on the rear side of the vehicle is formed with a distance therebetween in the vehicle width direction. As viewed in the vehicle front-rear direction, the plurality of application portions is formed such that the rear application portion is disposed between the front application portions that are adjacent to each other.

According to this embodiment, when the roof panel is bonded to the cross member by using a mastic adhesive, the roof panel is fixed in a state where the front application portions and the rear application portions in the two lines in the vehicle front-rear direction are displaced from each other in the vehicle width direction. Among the plurality of front application portions and the plurality of rear application portions, the central application portions are disposed in a distributed manner in the vehicle front-rear direction. This configuration can reduce excessive binding of the roof panel while stabilizing the bonding condition of the roof panel. In addition, the application portions in the two lines, one including the plurality of front application portions and the other including the rear application portions, are arranged in a displaced manner (i.e., in a staggered manner). This configuration can stably bond the roof panel to the cross member in a larger area while reducing the amount of the mastic adhesive applied.

This specification also describes a vehicle roof structure as the present disclosure. The vehicle roof structure according to the present disclosure is a vehicle roof structure including: an upper structure including a front header located on a front side of a vehicle, a rear header located on a rear side of a vehicle, a pair of side rails adapted to couple opposite ends of the front header in a vehicle width direction and couple opposite ends of the rear header in a vehicle width direction, and a cross member adapted to couple the pair of side rails in a vehicle width direction; and a roof panel fixed to the upper structure so as to close a space surrounded by the front header, the rear header, and the pair of side rails from above the cross member.

The roof panel is mechanically fixed to the front header, the rear header, and the pair of side rails and is fixed to the cross member via a plurality of application portions having a mastic adhesive applied thereto. The plurality of application portions is formed on the cross member with a distance therebetween in the vehicle width direction. Among the plurality of application portions, a central application portion disposed at a center of the cross member in the vehicle width direction has a length that is shorter than a length of an end-side application portion disposed on opposite sides of the center in the vehicle width direction.

According to the present disclosure, the roof panel is mechanically fixed to the front header, the rear header, and the pair of side rails that form a part of the upper structure. In addition, the cross member is coupled, across the pair of side rails, in the space surrounded by the front header, the rear header, and the pair of side rails. The roof panel is fixed to the cross member via the plurality of application portions having a mastic adhesive applied thereto. By way of such fixing, the space surrounded by the front header, the rear header, and the pair of side rails can be closed by the roof panel.

According to the present disclosure, the plurality of application portions is formed on the cross member with a distance therebetween in the vehicle width direction, and so can fix the roof panel to the cross member. Here, among the plurality of application portions, a central application portion has a length that is shorter than a length of an end-side application portion. Accordingly, the center of the roof panel in the vehicle width direction is less likely to be bound by the mastic adhesive as compared to the portions on the opposite sides of the center. Thus, the central application portion can facilitate deformation of the center of the roof panel while binding the roof panel which undergoes thermal expansion and thermal contraction, and so can suppress distortion of the center of the roof panel in the vehicle width direction.

In some embodiments, the central application portion is dot-shaped, and the end-side application portion is line-shaped. According to this embodiment, since the dot-shaped central application portion has a smaller amount of the mastic adhesive applied than the amount of the mastic adhesive in the other portions, the binding of the roof panel can be limited. As a result, it is possible to more surely suppress distortion of the roof panel and prevent unnatural reflection on the surface of the roof panel. Meanwhile, since the line-shaped end-side application portion has a length that is longer than the length of the central application portion in the vehicle width direction, the adhesive strength between the roof panel and the cross member can be increased.

In some embodiments, the plurality of application portions is formed on the cross member in two lines in a vehicle front-rear direction. A plurality of front application portions arranged in one line on the front side of the vehicle is formed with a distance therebetween in the vehicle width direction and a plurality of rear application portions arranged in one line on the rear side of the vehicle is formed with a distance therebetween in the vehicle width direction. As viewed in the vehicle front-rear direction, the rear application portion is disposed between the front application portions that are adjacent to each other.

According to this embodiment, the roof panel is fixed to the cross member in a state where the front application portions and the rear application portions in the two lines in the vehicle front-rear direction are displaced from each other in the vehicle width direction. Among the plurality of front application portions and the plurality of rear application portions, the central application portions are disposed in a distributed manner in the vehicle front-rear direction. This configuration can reduce the binding of the roof panel while stabilizing the bonding condition of the roof panel. In addition, the roof panel is bonded in the vehicle front-rear direction via the application portions in the two lines, one including the plurality of front application portions and the other including the rear application portions. This configuration can stably bond a larger area of the roof panel while reducing the amount of the mastic adhesive applied.

According to the present disclosure, it is possible to suppress occurrence of distortion of a roof panel.

DETAILED DESCRIPTION

1. Regarding Vehicle Roof Structure 1

Figure 1A:
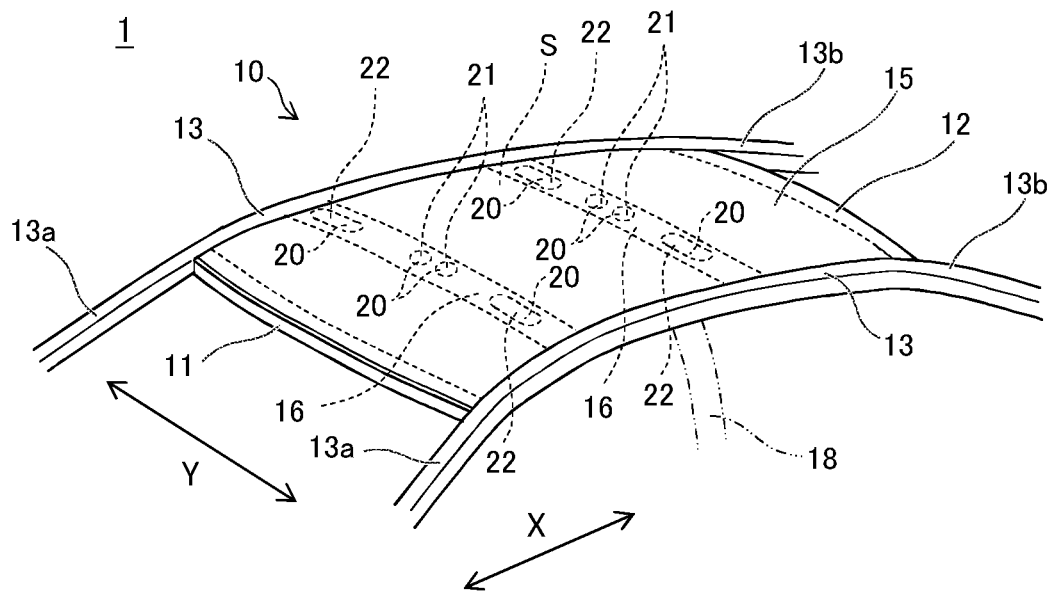
FIG. 1A is a perspective view of a main part of the vehicle roof structure according to the present embodiment.
Figure 1B:
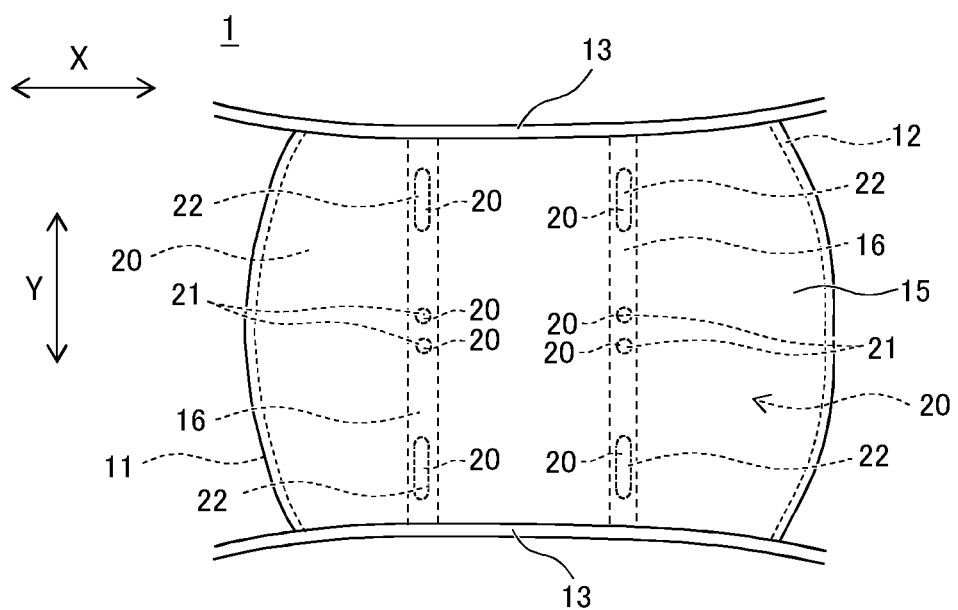
FIG. 1B is a plan view of the main part of the vehicle roof structure illustrated in FIG. 1A.
Figure 2:
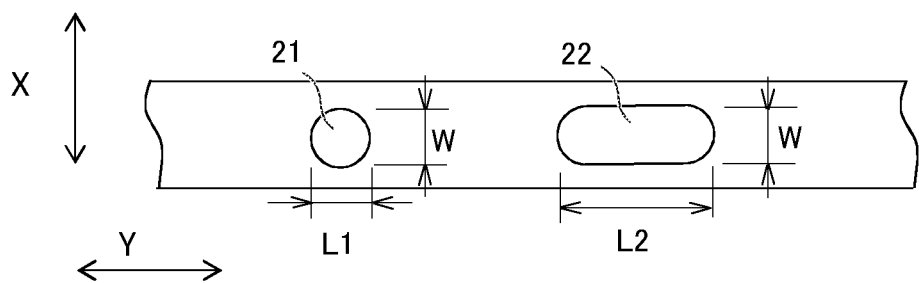
FIG. 2 is a schematic plan view of a central application portion and an end-side application portion disposed on a cross member of the vehicle roof structure according to the present embodiment.

Hereinafter, an embodiment of the vehicle roof structure according to the present disclosure will be described in detail with reference to the drawings. FIG. 1A is a perspective view of a main part of the vehicle roof structure according to the present embodiment. FIG. 1B is a plan view of the main part of the vehicle roof structure illustrated in FIG. 1A. FIG. 2 is a schematic plan view of a central application portion and an end-side application portion disposed on a cross member of the vehicle roof structure according to the present embodiment. By way of example, the vehicle roof structure 1 of the present embodiment shows four-door sedan as a vehicle.

In FIG. 1A and FIG. 1B, the vehicle roof structure 1 includes an upper structure 10 and a roof panel 15 attached to the upper structure 10. The upper structure 10 includes a front header (i.e., front roof header panel) 11, a rear header (i.e., rear roof header panel) 12, a pair of side rails (i.e., side rail frames) 13, 13, and a plurality of cross members 16, 16. These members are joined together through welding.

The front header 11 is located on the front side of the vehicle and supports the upper portion of the front windshield, and the rear header 12 is located on the rear side of the vehicle and supports the upper portion of the rear windshield. The pair of side rails 13, 13 is located on both sides of the front header 11 and the rear header 12 in the vehicle width direction.

Each side rail 13 is coupled to one of the ends of the front header 11 in the vehicle width direction Y and one of the ends of the rear header 12 in the vehicle width direction Y. Thus, the pair of side rails 13, 13 couples the opposite ends of the front header 11 in the vehicle width direction Y and couples the opposite ends of the rear header 12 in the vehicle width direction Y. This forms a space S opening upward, which is surrounded by the front header 11, the rear header 12, and the pair of side rails 13, 13.

Each cross member 16 is a reinforcing member that couples the pair of side rails 13, 13 in the vehicle width direction Y. Each cross member 16 is disposed in the vehicle width direction Y within the space S. Specifically, the cross members 16, 16 are disposed in parallel with each other between the front header 11 and the rear header 12 in the vehicle front-rear direction X.

In the present embodiment, as described above, the vehicle roof structure 1 is a structure reinforced by the pair of cross members 16, 16, which is located on the vehicle interior side of the roof panel 15, so as to prevent deformation of the roof panel 15. The two cross members 16, 16 function as reinforcing members.

Here, the pair of side rails 13, 13 on the front side of the vehicle is front pillars 13a, 13a, which support the front window (not illustrated) together with a front coupling member (not illustrated) that couples the lower ends of the front pillars 13a, 13a in the vehicle width direction Y. The pair of side rails 13, 13 in the rear side of the vehicle is rear pillars 13b, 13b, which support the rear window (not illustrated) together with a rear coupling member (not illustrated) that couples the lower ends of the rear pillars 13b, 13b in the vehicle width direction Y. The pair of side rails 13, 13 may have center pillars 18, 18 that extend downward from the central portion in the vehicle front-rear direction X.

The front header 11, the rear header 12, the pair of side rails 13, 13, and the cross members 16, 16 are formed through press-forming a metal sheet, such as a high-tensile steel sheet, for example, so as to achieve a predetermined vehicle strength. These members are joined together through welding, for example. The roof panel 15 is formed into a shape that curves upward through press-forming a steel sheet, for example.

The roof panel 15 is fixed to the upper structure 10 so as to close the space S surrounded by the front header 11, the rear header 12, and the pair of side rails 13, 13 from above the cross members 16, 16. Specifically, the roof panel 15 is mechanically fixed, at its peripheral portion, to the front header 11, the rear header 12, and the pair of side rails 13, 13. In the present embodiment, the peripheral portion of the roof panel 15 is fixed to each of the front header 11, the rear header 12, and the pair of side rails 13, 13 through spot welding. It should be noted that other fixing means, such as screwing, for example, may be used for the mechanical fixing.

The roof panel 15 is mechanically fixed at its peripheral portion, and is also fixed to the cross members 16, 16 via a plurality of application portions 20, 20 made of a mastic adhesive.

Herein, the mastic adhesive is used to fix the roof panel 15 to the two cross members 16, 16. The mastic adhesive includes a thermosetting resin or a thermosetting material, such as thermosetting rubber, as a base resin, and exhibits elastic properties through heat curing.

The mastic adhesive may further include a foaming agent, such as an organic foaming agent or an inorganic foaming agent, for example. The foaming agent causes the mastic adhesive to foam while heat curing, which makes the application portions 20, 20 become elastically deformable. It should be noted that the heat curing of the mastic adhesive may take place after coating (for example, electrodeposition coating) on the surface of the roof panel 15, followed by heating for baking the coating.

In the state illustrated in FIG. 1A and FIG. 1B, the mastic adhesive has already undergone heat curing, and thus the application portions 20, 20 are elastically deformable. If the mastic adhesive has already undergone foaming by the foaming agent, the application portions 20, 20 are porous, which makes them even more elastically deformable under compression. In addition, the mastic adhesive may contain a filler, a crosslinking agent, a softer, or the like, as appropriate. Examples of such a mastic adhesive include, but not particularly limited to, a known mastic adhesive.

The plurality of application portions 20, 20 having the mastic adhesive applied thereto is formed on each cross member 16 with a distance therebetween in the longitudinal direction (that is, the vehicle width direction Y) of the cross members 16, 16. In the present embodiment, as illustrated in FIG. 2, among the plurality of application portions 20, 20, the central application portion 21 disposed at the center of each of the cross members 16, 16 in the vehicle width direction Y has a length L1 that is shorter than a length L2 of the end-side application portions 22, 22 disposed on the opposite sides of the center in the vehicle width direction Y. Specifically, in the present embodiment, the central application portion 21 is dot-shaped, and the end-side application portions 22, 22 are line-shaped.

Suppose that the length of the central application portion 21 and the end-side application portion 22 in the vehicle front-rear direction X (in the present embodiment, corresponding to the diameter of the mastic adhesive ejected from a nozzle) is a width W and the respective lengths of the central application portion 21 and the end-side application portion 22 in the vehicle width direction Y are a length L1 and a length L2, the width W and the lengths L1, L2 may satisfy the following relations.

Specifically, the length L1 of the central application portion 21 may be less than or equal to 2.0 times the width W of the central application portion 21, or may be less than or equal to 1.5 times the width W of the central application portion 21. In addition, the length L1 of the central application portion 21 may be greater than or equal to 0.5 times the width W of the central application portion 21, or may be greater than or equal to 1.0 times the width W of the central application portion 21. In particular, the length L1 of the central application portion 21 may be less than or equal to the width W of the central application portion 21.

The length L2 of the end-side application portion 22 may be greater than or equal to 3.0 times the width W of the end-side application portion 22, or may be greater than or equal to 5.0 times the width W of the end-side application portion 22. The length L2 of the end-side application portion 22 may be less than or equal to 10.0 times the width W of the end-side application portion 22, or may be less than or equal to 7.0 times the width W of the end-side application portion 22. Furthermore, the length L2 of each end-side application portion 22 may be greater than or equal to 3.0 times the length L1 of the central application portion 21, or may be greater than or equal to 4.0 times the length L1 of the central application portion 21.

In the present embodiment, the roof panel 15 is mechanically fixed to the front header 11, the rear header 12, and the pair of side rails 13, 13 that form a part of the upper structure 10. In addition, the roof panel 15 is fixed to the cross members 16, 16 by an adhesive via the plurality of application portions 20, 20 having the mastic adhesive applied thereto. By way of such fixing, the space S surrounded by the front header 11, the rear header 12, and the pair of side rails 13, 13 can be closed by the roof panel 15.

In particular, in the present embodiment, the plurality of application portions 20, 20 is formed on each cross member 16 with a distance therebetween in the vehicle width direction Y, and among the plurality of application portions 20, 20, the central application portion 21 has the length L1 that is shorter than the length L2 of the end-side application portion 22. Accordingly, the center of the roof panel 15 in the vehicle width direction is less likely to be bound by the mastic adhesive as compared to the portions on the opposite sides of the center. Thus, the central application portion 21 can facilitate deformation of the center of the roof panel 15 while binding the roof panel 15 which undergoes thermal expansion and thermal contraction, and so can suppress distortion of the center of the roof panel 15 in the vehicle width direction Y.

In particular, in the present embodiment, since the central application portion 21 is dot-shaped and has a smaller amount of the mastic adhesive applied than the amount of the mastic adhesive in the other portions, the binding of the roof panel 15 is limited. As a result, it is possible to more surely suppress distortion of the roof panel 15 and prevent unnatural reflection on the surface of the roof panel 15. Meanwhile, since the end-side application portion 22 is line-shaped and has the length L2 that is longer than the length of the central application portion 21 in the vehicle width direction Y, the adhesive strength between the roof panel 15 and the cross member 16 can be increased. The present embodiment can expect such effects to a greater extent, particularly with the lengths L1, L2 set within the above-described range with respect to the width W of the central application portion 21 and the end-side application portion 22.

2. Regarding Method for Assembling Vehicle Roof Structure 1

Figure 3:
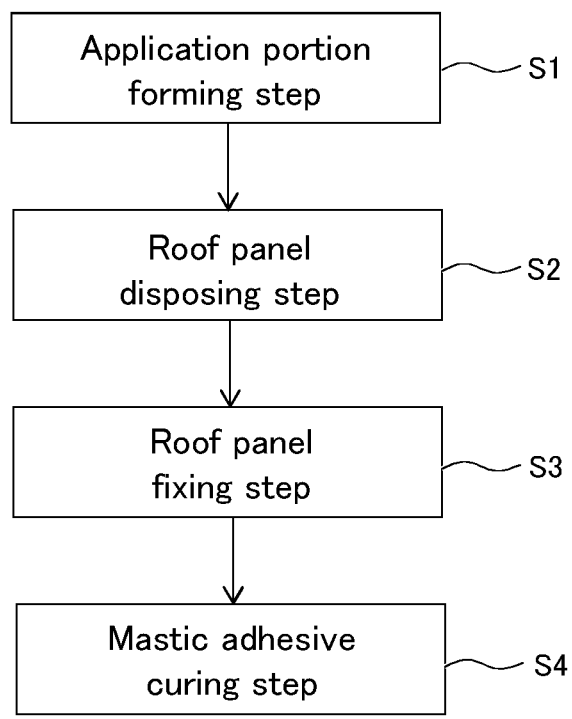
FIG. 3 is a flowchart for explaining a method for assembling the vehicle roof structure according to the present embodiment.

A method for assembling the vehicle roof structure 1 with the above-described configuration according to the present embodiment will be described with reference to FIG. 3 and FIG. 4A to FIG. 4D. FIG. 3 is a flowchart for explaining the method for assembling the vehicle roof structure 1 according to the present embodiment, and FIG. 4A to FIG. 4D are schematic views respectively explaining the steps shown in FIG. 3. The method for assembling the vehicle roof structure 1 to be described hereinbelow is a method for fixing the roof panel 15 to the upper structure 10 by closing the space S of the upper structure 10 by the roof panel 15.

2-1. Regarding Application Portion Forming Step S1

Figure 4A:
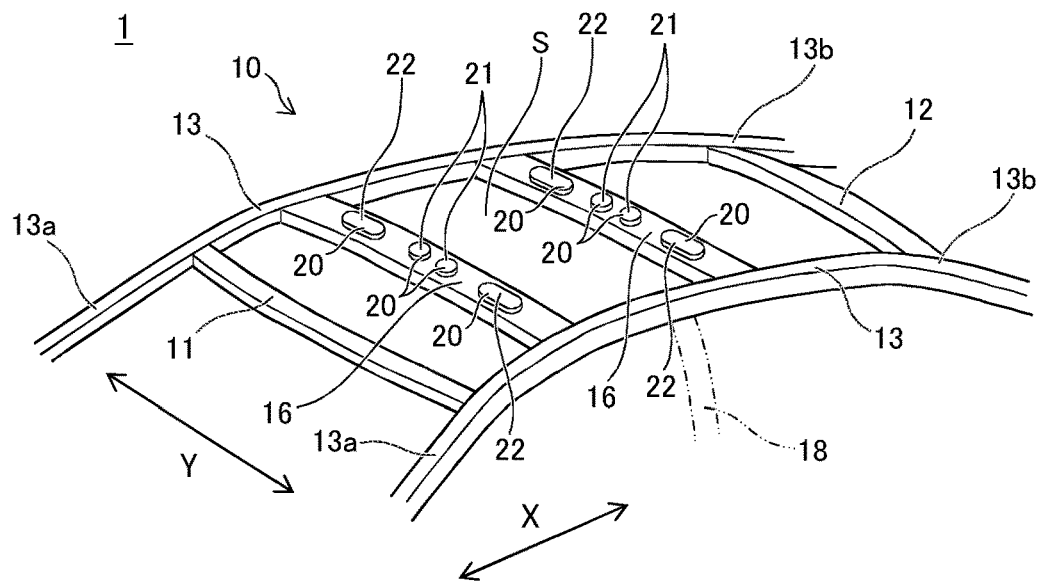
FIG. 4A is a schematic perspective view for explaining an application portion forming step shown in FIG. 3.

First, the method performs the application portion forming step S1 shown in FIG. 3 with respect to the above-described upper structure 10. Specifically, as illustrated in FIG. 4A, the plurality of application portions 20, 20 made of a mastic adhesive is disposed on each of the cross members 16, 16 with a distance between the plurality of application portions 20, 20 in the vehicle width direction Y. In this state, the mastic adhesive of the application portions 20, 20 is in an uncured state (i.e., gel form or slurry form), and if the mastic adhesive contains a foaming agent, the foaming agent is in an unfoamed state. The plurality of application portions 20, 20 can be formed by a typical application process using an adhesive application device, for example.

In the present embodiment, in the application portion forming step S1, the plurality of application portions 20, 20 is formed such that, among the plurality of application portions 20, 20, the central application portion 21 disposed at the center of each of the cross members 16, 16 in the vehicle width direction Y has a length L1 that is shorter than a length L2 of the end-side application portion 22 disposed on the opposite sides of the center in the vehicle width direction Y. More specifically, as illustrated in FIG. 2, the central application portion 21 is formed in a dot shape, and the end-side application portion 22 is formed in a line shape.

In the present embodiment, as described above, specifically the length L1 of the central application portion 21 may be less than or equal to 2.0 times the width W of the central application portion 21, or less than or equal to 1.5 times the width W of the central application portion 21. In addition, the length L1 of the central application portion 21 may be greater than or equal to 0.5 times the width W of the central application portion 21, or greater than or equal to 1.0 times the width W of the central application portion 21. In particular, the length L1 of the central application portion 21 may be less than or equal to the width W of the central application portion 21.

The length L2 of the end-side application portion 22 may be greater than or equal to 3.0 times the width W of the end-side application portion 22, or greater than or equal to 5.0 times the width W of the end-side application portion 22. Furthermore, the length L2 of each end-side application portion 22 may be greater than or equal to 3.0 times the length L1 of the central application portion 21, or greater than or equal to 4.0 times the length L1 of the central application portion 21.

2-2. Regarding Roof Panel Disposing Step S2

Figure 4B:
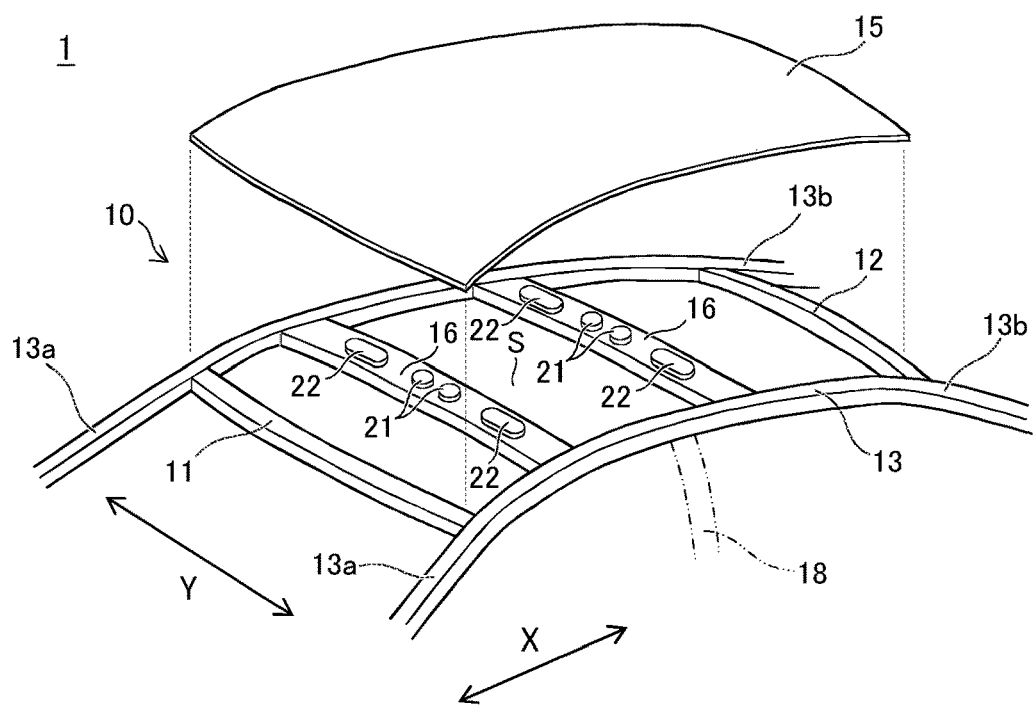
FIG. 4B is a schematic perspective view for explaining a roof panel disposing step shown in FIG. 3.

As shown in FIG. 3, the method performs the roof panel disposing step S2. Specifically, as illustrated in FIG. 4B, the roof panel 15 is disposed on the upper structure 10 via the plurality of application portions 20, 20 so as to close the space S surrounded by the front header 11, the rear header 12, and the pair of side rails 13, 13 from above the cross members 16, 16. At this time, the roof panel 15 comes into contact with the application portions 20, 20 disposed on the cross members 16, 16.

2-3. Regarding Roof Panel Fixing Step S3

Figure 4C:
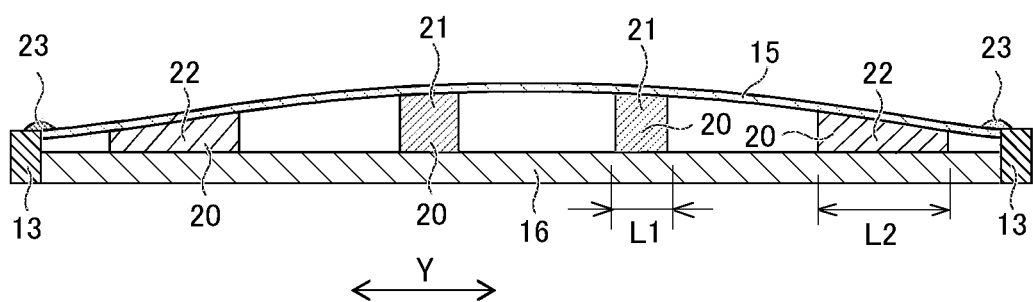
FIG. 4C is a schematic cross-sectional view for explaining a roof panel fixing step shown in FIG. 3.

As shown in FIG. 3, the method performs the roof panel fixing step S3. Specifically, as illustrated in FIG. 4C, the roof panel 15 is mechanically fixed to the front header 11, the rear header 12, and the pair of side rails 13, 13. In the present embodiment, the peripheral portion of the roof panel 15 is fixed to the front header 11, the rear header 12, and the pair of side rails 13, 13 through spot welding, for example. This makes the roof panel 15 fixed to the upper structure 10 via a welding portion 23. It should be noted that other fixing means, such as screwing or swaging, for example, may be used for the fixing of the roof panel 15.

2-4. Regarding Mastic Adhesive Curing Step S4

Figure 4D:
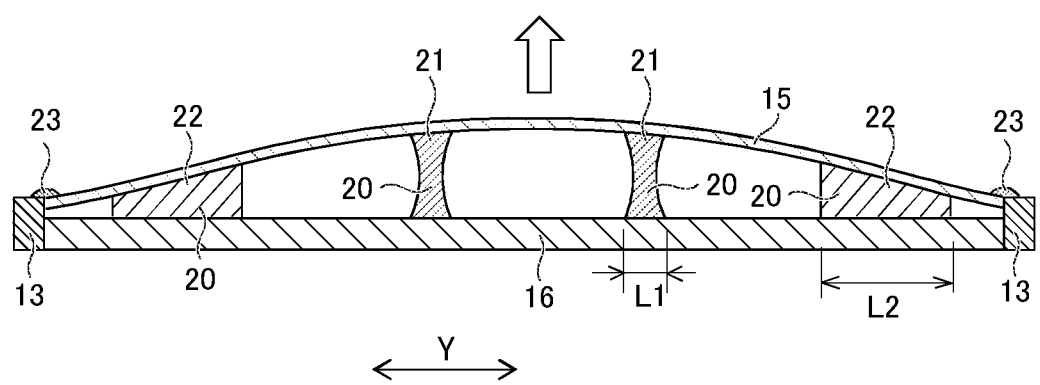
FIG. 4D is a schematic cross-sectional view of the vehicle roof structure for explaining a mastic adhesive curing step shown in FIG. 3.

As shown in FIG. 3, the method performs the mastic adhesive curing step S4. Specifically, as illustrated in FIG. 4D, the mastic adhesive is allowed to cure by heating the plurality of application portions 20, 20 together with the upper structure 10 and the roof panel 15. In the present embodiment, the method includes a coating step (not shown in FIG. 3) between the roof panel fixing step S3 and the mastic adhesive curing step S4 shown in FIG. 3, and this coating step forms a film on the surface of the roof panel 15 through electrodeposition coating. Thereafter, the vehicle (i.e., vehicle body) is put into a furnace to bake (i.e., heat) the film formed in the coating step, so as to form a stable film on the surface of the roof panel 15. In the present embodiment, the plurality of application portions 20, 20 is heated by utilizing the heating during the baking of the film, and then the mastic adhesive of the plurality of application portions 20, 20 is allowed to cure.

Here, in this heating, as illustrated in FIG. 4D, the temperature of the roof panel 15 rises faster than that of the cross members 16, 16 in the furnace, and thus the roof panel 15 at its perimeter bound by the upper structure 10 deforms to expand. Thereafter, the temperature of the cross members 16, 16 also rises in accordance with the temperature profile of the roof panel 15. This makes the roof panel 15, which has deformed to expand, try to return to its original shape.

At this time, since the plurality of application portions 20, 20 is disposed such that the central application portion 21 has the length L1 that is shorter than the length L2 of the end-side application portion 22, the binding force of the central application portion 21 is limited at the center of the roof panel 15 in the vehicle width direction Y. As such, even if the mastic adhesive of the central application portion 21 starts to cure, it is difficult to block the phenomenon in which the roof panel 15 that once deformed to expand tries to return to its original shape, and it is possible to suppress temporary distortion of the roof panel 15 caused by heating. Accordingly, it is possible to allow the roof panel 15 to be securely bonded to the cross member 16 via the end-side application portions 22 on the opposite sides of the center while suppressing distortion of the center of the roof panel 15 which easily deforms. As a result, it is possible to prevent unnatural reflection on the surface of the roof panel 15 caused by the distortion while ensuring the fixing of the roof panel 15.

In particular, since the central application portion 21 is dot-shaped and has a smaller amount of the mastic adhesive applied than the amount of the mastic adhesive in the other portions, the binding of the roof panel 15 can be limited. As a result, it is possible to suppress distortion of the roof panel 15 and prevent unnatural reflection on the surface of the roof panel 15. Meanwhile, since the end-side application portion 22 is line-shaped and has a length that is longer than the length of the central application portion 21 in the vehicle width direction Y, the adhesive strength between the roof panel 15 and the cross member 16 can be increased.

Figure 5:
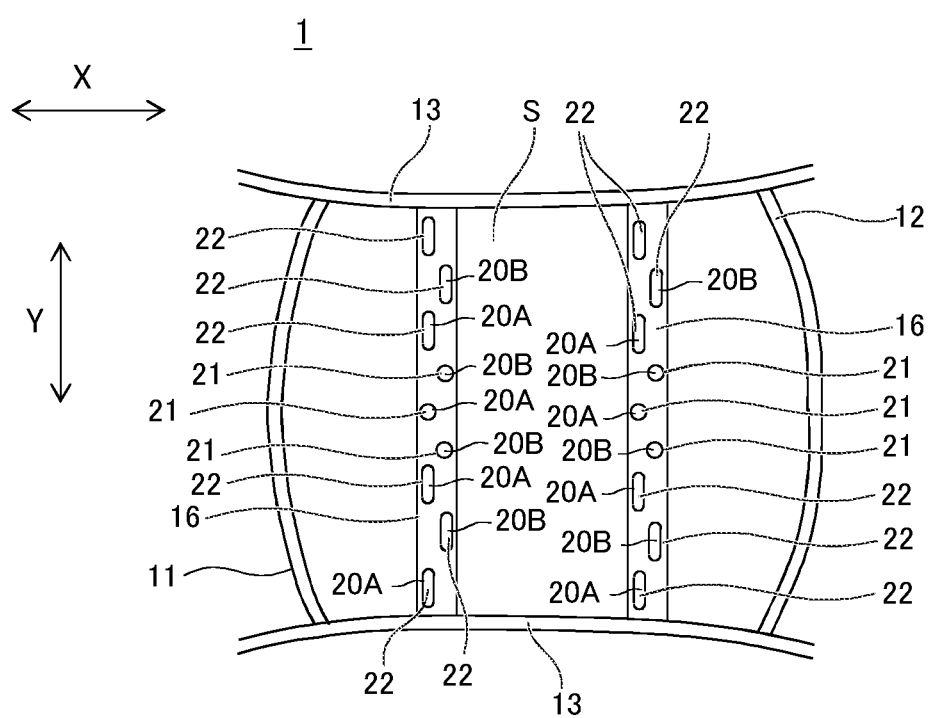
FIG. 5 is a plan view of the main part in a state where the roof panel is removed, showing another embodiment of the vehicle roof structure according to the present disclosure.

Next, another embodiment of the present disclosure will be described with reference to FIG. 5. FIG. 5 is a plan view of the main part in a state where the roof panel is removed, showing another embodiment of the vehicle roof structure according to the present disclosure. It should be noted that the vehicle roof structure 1 of the present embodiment is different from the vehicle roof structure 1 illustrated in FIG. 1B in the aspect of application portions having a mastic adhesive applied thereto. The aspect of application portions will be described below, and the detailed description of the configurations other than such a difference will be omitted.

As illustrated in FIG. 5, in the present embodiment, in the same manner as in the embodiment illustrated in FIG. 2, among a plurality of application portions, the central application portion 21 disposed at the center of the cross member 16 in the vehicle width direction Y has a length that is shorter than a length of the end-side application portion 22 disposed on the opposite sides of the center in the vehicle width direction Y.

Furthermore, in the present embodiment, the plurality of application portions is formed in two lines in the vehicle front-rear direction X on the cross member 16. Specifically, a plurality of front application portions 20A, 20A arranged in the line on the front side of the vehicle is formed with a distance therebetween in the vehicle width direction Y, and a plurality of rear application portions 20B, 20B arranged in the line on the rear side of the vehicle is formed with a distance therebetween in the vehicle width direction Y. The front application portions 20A, 20A and the rear application portions 20B, 20B are staggered relative to one another. Specifically, as viewed in the vehicle front-rear direction X, the rear application portion 20B is disposed between the adjacent front application portions 20A, 20A.

Here, the forming of the plurality of application portions may be performed in the application portion forming step S1 shown in FIG. 3. Specifically, in the application portion forming step S1, the plurality of application portions is formed on the cross member 16 in two lines in the vehicle front-rear direction X as illustrated in FIG. 5. At this time, the plurality of front application portions 20A, 20A in the line on the front side of the vehicle is arranged with a distance therebetween in the vehicle width direction Y, and the plurality of rear application portions 20B, 20B in the line on the rear side of the vehicle is arranged with a distance therebetween in the vehicle width direction Y. At this time, as viewed in the vehicle front-rear direction X, the plurality of application portions may be formed such that the rear application portion 20B is disposed between the adjacent front application portions 20A, 20A.

According to the present embodiment, among the plurality of front application portions 20A, 20A and the plurality of rear application portions 20B, 20B, the central application portions 21, 21 are disposed in a distributed manner in the vehicle front-rear direction X. This can reduce excessive binding of the roof panel 15 while stabilizing the bonding condition of the roof panel 15. In addition, the application portions in the two lines, one including the plurality of front application portions 20A, 20A and the other including the rear application portions 20B, 20B, are arranged in a displaced manner in the vehicle width direction Y. This can stably bond the roof panel 15 to the cross member 16 in a larger area while reducing the amount of the mastic adhesive applied. Consequently, it is possible to stably fix the roof panel 15 to the upper structure 10 and also suppress distortion of the roof panel 15.

Figure 6:
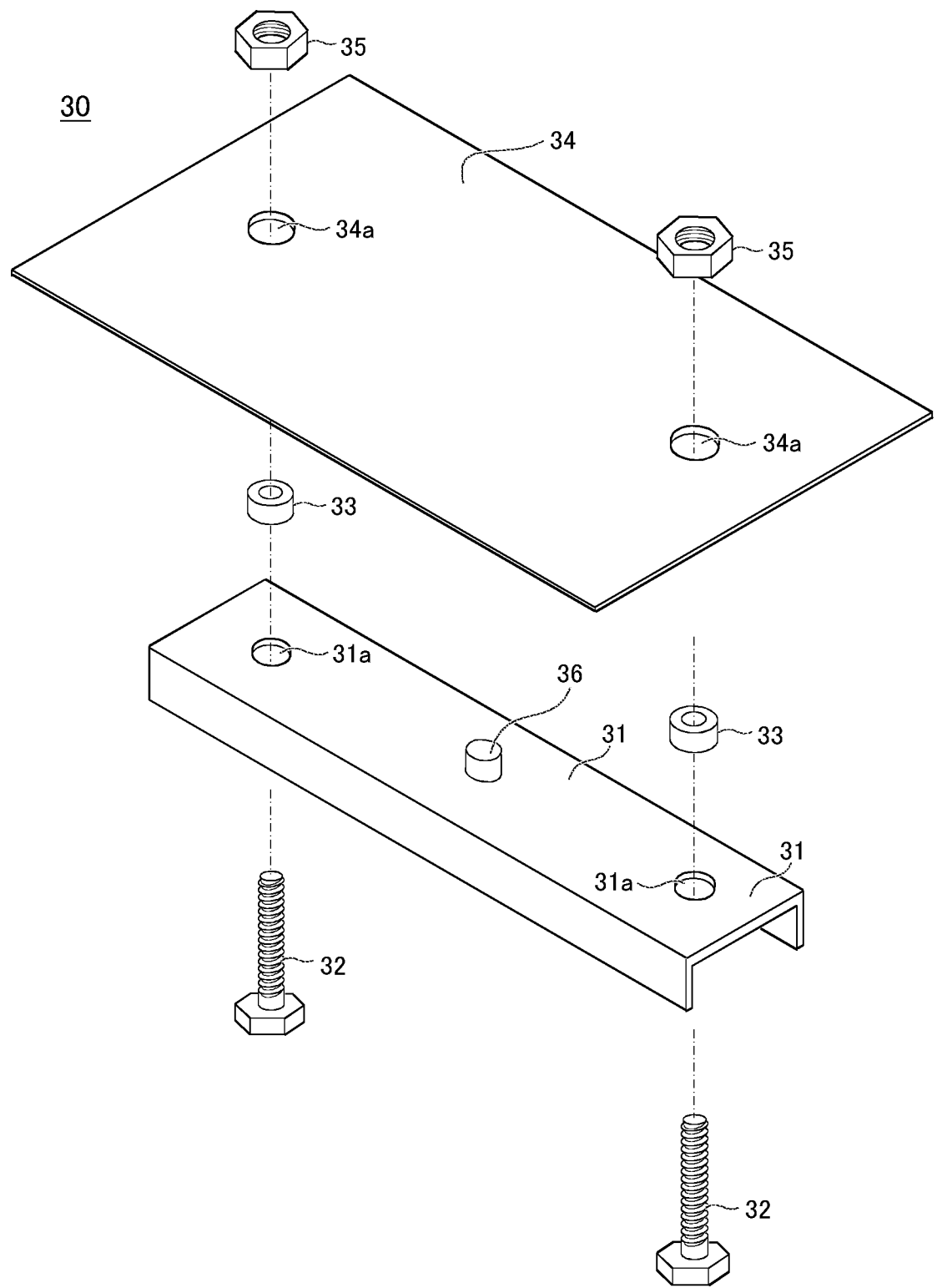
FIG. 6 is an exploded perspective view of the main part, showing a test body that is used to examine a distortion amount of the roof panel in one embodiment of the vehicle roof structure according to the present disclosure.

Here, a test body 30 that is used to examine a distortion amount of the roof panel 15 in the vehicle roof structure 1 of the present embodiment will be described with reference to FIG. 6. The test body 30 includes a base 31 corresponding to the cross members 16, 16 of the upper structure 10 and a panel (i.e., steel sheet) 34 corresponding to the roof panel 15. The base 31 is formed through bending a thick metal plate (thickness of greater than or equal to 1.6 mm, for example) into a U-shaped cross section to have a higher rigidity, and the panel 34 is a plate with a thickness smaller than that of the base 31 (a thickness of 0.6 mm, for example).

The base 31 and the panel 34 respectively have through holes 31a, 34a formed therein. First, an application portion 36 having a mastic adhesive applied thereto is formed between the through holes 31a, 31a of the base 31. FIG. 6 shows the application portion 36 of the test body 30 according to Reference Example 1, which will be described later. Next, in a state where spacers (i.e., washers) 33, 33 are sandwiched between the base 31 and the panel 34, a bolt 32 is passed through the through hole 31a, the spacer 33, and the through hole 34a in this order to fasten the nuts 35, 35 into the bolts 32, 32. This allows the panel 34 to be mechanically fixed to the base 31 on the opposite sides of the base 31, thereby obtaining a test body in which the application portion 36 made of a mastic adhesive is disposed between the bolts 32, 32. Heating the test body 30 under the actual heating conditions in the heating furnace can confirm the tendency of distortion of the roof panel in actual vehicles.

Figure 7:
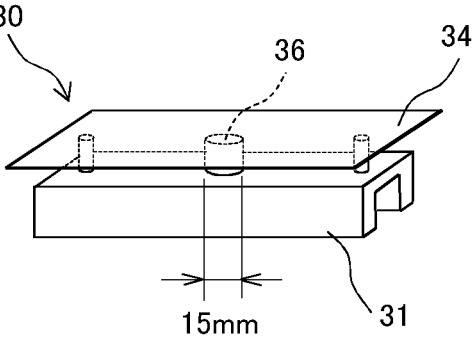
FIG. 7 is a table for explaining the test body according to Reference Examples 1 to 4.
Figure 7:
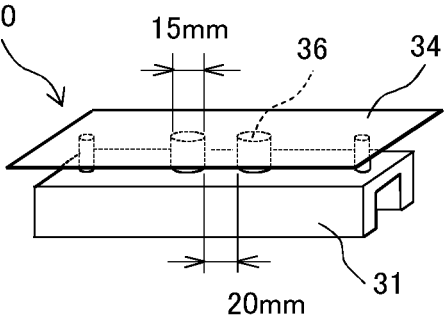
Figure 7:
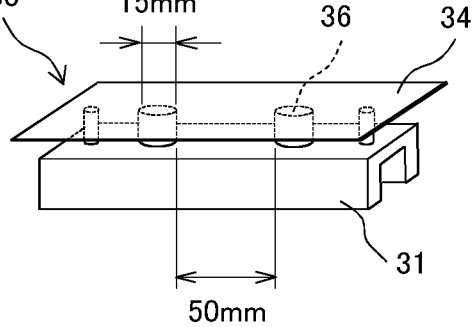
Figure 7:
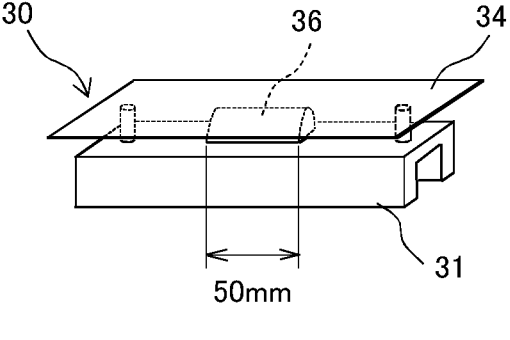

In Reference Examples 1 to 4 to be described below, the test body 30 was produced under the conditions illustrated in FIG. 7, and each test body 30 was heated. In Reference Example 1, one dot-shaped application portion having a length of 15 mm was formed at the center of the base 31 in the longitudinal direction. In Reference Example 2, two dot-shaped application portions having a length of 15 mm were formed at the center of the base 31 in the longitudinal direction, with a distance of 20 mm therebetween. In Reference Example 3, two dot-shaped application portions having a length of 15 mm were formed at the center of the base 31 in the longitudinal direction, with a distance of 50 mm therebetween. In Reference Example 4, one line-shaped application portion having a length of 50 mm was formed at the center of the base 31 in the longitudinal direction. The test bodies 30 according to Reference Examples 1 to 4 were heated under the same condition to allow the mastic adhesive to cure. Thereafter, laser light was scanned from a laser displacement gauge in the longitudinal direction of the panel 34 to measure a deformation amount of the panel 34. The result is shown in FIG. 8.

Figure 8:
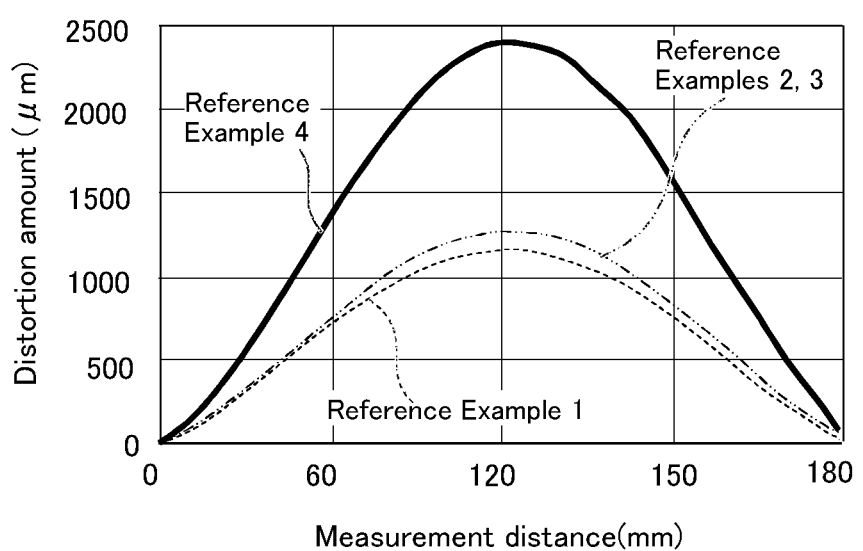
FIG. 8 is a graph showing a distortion amount of a steel sheet of the test body according to Reference Examples 1 to 4.

As can be clearly seen from FIG. 8, Reference Example 4 had a deformation amount of the panel 34 that was greater than that of Reference Examples 1 to 3. Reference Examples 2 and 3 had a deformation amount of the panel 34 that was greater than that of Reference Example 1. The panel 34 is mechanically fixed (i.e., bound) by the bolts 32 and the nuts 35 on the opposite sides in the longitudinal direction, and the center of the panel 34 is likely to deform. Here, if the line-shaped application portion 36 is disposed as illustrated in Reference Example 4, the deformation of the panel 34 is more likely to be bound after the mastic adhesive cures, as compared to Reference Examples 1 to 3. In the case of Reference Example 4, when the panel 34, which has deformed to expand in heating, tries to return to its original shape, the mastic adhesive of the application portion 36 cures and the panel 34 is less likely to return to its original shape. It is found that this resulted in a greater deformation amount of the panel 34 in Reference Example 4 as compared to Reference Examples 1 to 3. It is found that, for the same reason, Reference Examples 2 and 3, in which two dot-shaped application portions 36, 36 were disposed, had a greater deformation amount of the panel 34 as compared to Reference Example 1, in which one dot-shaped application portion 36 was disposed.

Although the embodiments of the present disclosure have been described in detail above, the present disclosure is not limited to the above embodiments, and various design changes are possible in so far as they are within the spirit of the present disclosure in the scope of the claims.

For example, the width of the central application portion is equal to the width of the end-side application portion in the present embodiment. However, the central application portion and the end-side application portion may have different widths. In addition, the present embodiment shows an example of providing two cross members. However, the number of cross members may be one or three or more.

What is claimed is:
1. A method for assembling a vehicle roof structure including:

an upper structure including a front header located on a front side of a vehicle, a rear header located on a rear side of a vehicle, a pair of side rails adapted to couple opposite ends of the front header in a vehicle width direction and couple opposite ends of the rear header in a vehicle width direction, and a cross member adapted to couple the pair of side rails in a vehicle width direction; and a roof panel fixed to the upper structure so as to close a space surrounded by the front header, the rear header, and the pair of side rails from above the cross member, the method comprising:

forming a plurality of application portions having a mastic adhesive applied thereto on the cross member with a distance therebetween in a vehicle width direction;

disposing the roof panel on the upper structure via the plurality of application portions so as to close the space surrounded by the front header, the rear header, and the pair of side rails from above the cross member from above the cross member;

mechanically fixing the roof panel to the front header, the rear header, and the pair of side rails; and curing the mastic adhesive by heating the plurality of application portions together with the upper structure and the roof panel, wherein in the forming of the plurality of application portions, the plurality of application portions is formed such that among the plurality of application portions, a central application portion disposed at a center of the cross member in the vehicle width direction has a length that is shorter than a length of an end-side application portion disposed on opposite sides of the center in the vehicle width direction.

2. The method for assembling a vehicle roof structure according to claim 1, wherein the central application portion is formed in a dot shape and the end-side application portion is formed in a line shape.

3. The method for assembling a vehicle roof structure according to claim 1, wherein:

the plurality of application portions is formed on the cross member in two lines in a vehicle front-rear direction, a plurality of front application portions in one line on the front side of the vehicle is formed with a distance therebetween in the vehicle width direction and a plurality of rear application portions in one line on the rear side of the vehicle is formed with a distance therebetween in the vehicle width direction, and as viewed in the vehicle front-rear direction, the plurality of application portions is formed such that the rear application portion is disposed between the front application portions that are adjacent to each other.

4. A vehicle roof structure comprising:

an upper structure including a front header located on a front side of a vehicle, a rear header located on a rear side of a vehicle, a pair of side rails adapted to couple opposite ends of the front header in a vehicle width direction and couple opposite ends of the rear header in a vehicle width direction, and a cross member adapted to couple the pair of side rails in a vehicle width direction; and a roof panel fixed to the upper structure so as to close a space surrounded by the front header, the rear header, and the pair of side rails from above the cross member, wherein:

the roof panel is mechanically fixed to the front header, the rear header, and the pair of side rails and is fixed to the cross member via a plurality of application portions having a mastic adhesive applied thereto, the plurality of application portions is formed on the cross member with a distance therebetween in the vehicle width direction, and among the plurality of application portions, a central application portion disposed at a center of the cross member in the vehicle width direction has a length that is shorter than a length of an end-side application portion disposed on opposite sides of the center in the vehicle width direction.

5. The vehicle roof structure according to claim 4, wherein the central application portion is dot-shaped and the end-side application portion is line-shaped.

6. The vehicle roof structure according to claim 4, wherein:

the plurality of application portions is formed on the cross member in two lines in a vehicle front-rear direction, a plurality of front application portions arranged in one line on the front side of the vehicle is formed with a distance therebetween in the vehicle width direction and a plurality of rear application portions arranged in one line on the rear side of the vehicle is formed with a distance therebetween in the vehicle width direction, and as viewed in the vehicle front-rear direction, the rear application portion is disposed between the front application portions that are adjacent to each other.

\* \* \* \* \*